US009796390B2

United States Patent
Halder et al.

(10) Patent No.: US 9,796,390 B2
(45) Date of Patent: Oct. 24, 2017

(54) VEHICLE SENSING GRID HAVING DYNAMIC SENSING CELL SIZE

(71) Applicant: Faraday&Future Inc., Gardena, CA (US)

(72) Inventors: Bibhrajit Halder, Palo Alto, CA (US); Sowmya Gade, Torrance, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/089,446

(22) Filed: Apr. 1, 2016

(65) Prior Publication Data

US 2017/0247036 A1    Aug. 31, 2017

Related U.S. Application Data

(60) Provisional application No. 62/301,480, filed on Feb. 29, 2016.

(51) Int. Cl.
*B60W 40/02* (2006.01)
*G08G 1/16* (2006.01)

(52) U.S. Cl.
CPC ......... *B60W 40/02* (2013.01); *B60W 2550/10* (2013.01); *G08G 1/16* (2013.01)

(58) Field of Classification Search
CPC ........ B60K 31/0008; B60K 2031/0041; B60K 2310/262; B60K 2310/264; B60K 26/021; B60K 28/10; B60K 31/0066; B60W 2550/14; B60W 2550/20; B60W 10/06; B60W 10/18; B60W 10/184;

(Continued)

(56) References Cited

U.S. PATENT DOCUMENTS

2003/0146841 A1* 8/2003 Koenig ............... A61B 5/18 340/576
2005/0033517 A1* 2/2005 Kondoh ............... B60K 26/021 701/301

(Continued)

FOREIGN PATENT DOCUMENTS

DE    10 2011 113 016 A1    3/2012
JP    2015-055541 A    3/2015

OTHER PUBLICATIONS

International Search Report dated Jul. 20, 2017, for PCT/US2017/020043, filed Feb. 28, 2017, three pages.

*Primary Examiner* — Fekadeselassie Girma
(74) *Attorney, Agent, or Firm* — Morrison & Foerster LLP

(57) ABSTRACT

A system that performs a method is disclosed. At a first time, characteristics about an area surrounding a vehicle are determined using a first sensing grid including first sensing cells of a first size. At a second time, after the first time, whether sensing cell size data satisfies sensing cell size change criteria is determined. In response to the determination: in accordance with a determination that the sensing cell size data satisfies the sensing cell size change criteria, characteristics about the area surrounding the vehicle are determined using a second sensing grid including second sensing cells of a second size, different from the first size. In accordance with a determination that the sensing cell size data does not satisfy the sensing cell size change criteria, characteristics about the area surrounding the vehicle are determined using the first sensing grid including the first sensing cells of the first size.

20 Claims, 7 Drawing Sheets

(58) Field of Classification Search
CPC ....... B60W 2520/14; B60W 2550/146; B60W 2550/148; B60W 2550/302; B60W 2550/306; B60W 2550/402; B60W 30/09; B60W 30/12; B60W 30/16; B60W 40/04; B60W 50/14; B60Q 9/008; B60T 17/18; B60T 7/22; G05G 1/38
USPC .............................. 340/436, 453, 686.6, 903
See application file for complete search history.

(56) References Cited

U.S. PATENT DOCUMENTS

| | | |
|---|---|---|
| 2006/0023917 A1 | 2/2006 | Dickmann et al. |
| 2007/0282530 A1* | 12/2007 | Meister .............. B60K 31/0008 701/301 |
| 2009/0125160 A1* | 5/2009 | Desai ....................... B60N 2/01 701/1 |
| 2009/0303234 A1 | 12/2009 | Becker |
| 2011/0046843 A1* | 2/2011 | Caveney ................ G08G 1/161 701/31.4 |
| 2012/0176234 A1* | 7/2012 | Taneyhill ............ B60K 31/0008 340/453 |
| 2015/0003683 A1 | 1/2015 | Grewe et al. |
| 2015/0353083 A1 | 12/2015 | Hasberg et al. |
| 2016/0114798 A1* | 4/2016 | Kim ...................... B60W 30/09 701/41 |

* cited by examiner

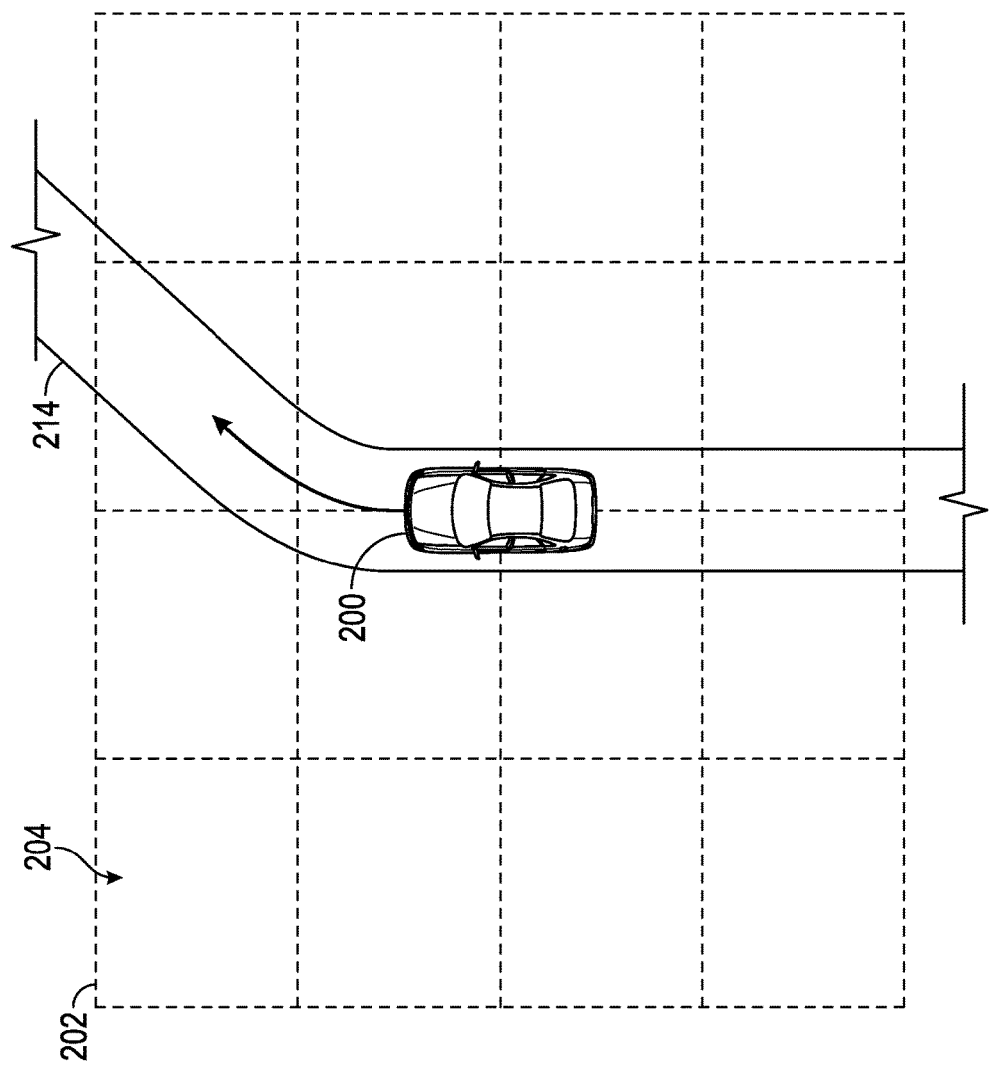

VEHICLE SENSING GRID HAVING DYNAMIC SENSING CELL SIZE

CROSS-REFERENCE TO RELATED APPLICATION

This application claims the benefit under 35 U.S.C. §119 (e) of U.S. Provisional Patent Application No. 62/301,480, filed Feb. 29, 2016, the content of which is incorporated by reference herein in its entirety for all purposes.

FIELD OF THE DISCLOSURE

This relates generally to sensing grid-based sensing of a vehicle's surroundings, and more particularly, to such sensing using a sensing grid having dynamically variable sensing cell size.

BACKGROUND OF THE DISCLOSURE

Vehicles, especially automobiles, increasingly include various sensors for detecting and gathering information about the vehicles' surroundings. Some vehicles may discretize such information about the vehicles' surroundings by utilizing a sensing grid having fixed, discrete sensing cells to determine this information. However, fixed sensing cells may not provide optimal balance between the resulting resolution of the information and computing power requirements in different circumstances.

SUMMARY OF THE DISCLOSURE

Examples of the disclosure are directed to dynamically altering sensing cell size in a sensing grid based on various considerations such as characteristics about objects in a vehicle's surroundings, characteristics about roads on which the vehicle is traveling, and characteristics about the vehicle itself, among other considerations. In this way, the vehicle can obtain high resolution information about its surroundings when desired, and can reduce computing power requirements for determining information about its surroundings when high resolution information is not needed.

BRIEF DESCRIPTION OF THE DRAWINGS

FIG. 2A illustrates another exemplary vehicle and sensing grid according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include various sensors for detecting and gathering information about the vehicles' surroundings. Some vehicles may discretize such information about the vehicles' surroundings by utilizing a sensing grid having fixed, discrete sensing cells to determine this information. However, fixed sensing cells may not provide optimal balance between the resulting resolution of the information and computing power requirements in different circumstances. Examples of the disclosure are directed to dynamically altering sensing cell size in a sensing grid based on various considerations such as characteristics about objects in a vehicle's surroundings, characteristics about roads on which the vehicle is traveling, and characteristics about the vehicle itself, among other considerations. In this way, the vehicle can obtain high resolution information about its surroundings when desired, and can reduce computing power requirements for determining information about its surroundings when high resolution information is not needed.

Figure 1A:
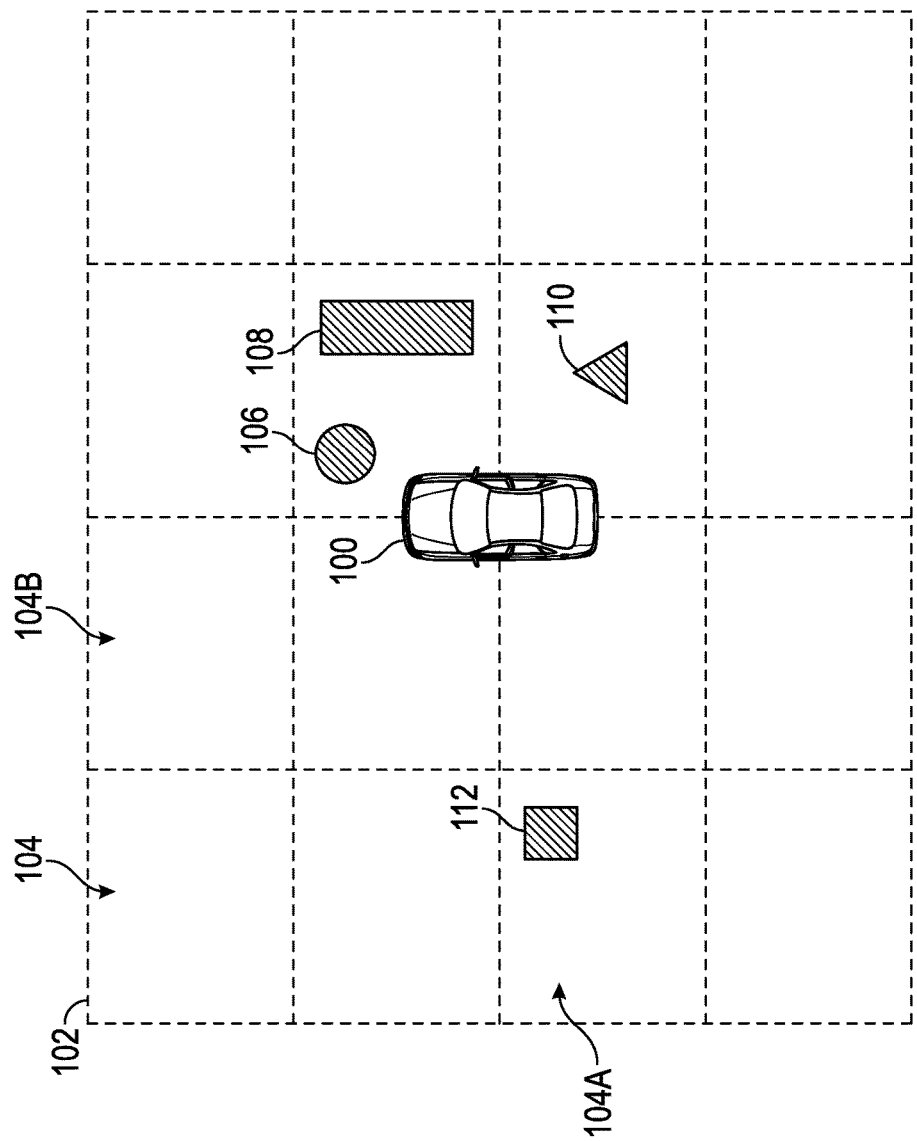
FIG. 1A illustrates an exemplary vehicle and sensing grid according to examples of the disclosure.

FIG. 1A illustrates exemplary vehicle 100 and sensing grid 102 according to examples of the disclosure. Vehicle 100 can include various sensors and systems for determining one or more characteristics about the vehicle's surroundings, such as the locations of objects in the vehicle's surroundings, the curvature, paths and/or locations of roads in the vehicles surroundings or on which the vehicle is traveling, the movements of other vehicles in the vehicle's surroundings, the types of objects in the vehicle's surroundings, etc. These sensors can include ultrasonic sensors, laser sensors, radar sensors, optical cameras, LIDAR sensors, or any other sensors that can be used to detect one or more characteristics about the vehicle's surroundings. Vehicle 100 can process data from one or more of these sensors to make automated or semi-automated decisions to facilitate appropriate vehicle action (e.g., during automated parking, during automated driving, etc.).

In some examples, vehicle 100 can make such determinations by partitioning its surroundings into sensing cells 104 in sensing grid 102—in some examples, referred to as an "occupancy grid." Once partitioned, vehicle 100 can make determinations about its surroundings on a per-sensing cell 104 basis. For example, vehicle 100 can determine that sensing cell 104A includes an object (e.g., an object to avoid during automated parking procedures), or that sensing cell 104B includes a curved portion of a road on which the vehicle is traveling (e.g., a curved portion of the road to follow during automated driving procedures). Vehicle 100 can make any number of determinations about the characteristics of its surroundings on a per-sensing cell 104 basis. Making such determinations on a per-sensing cell 104 basis can require less computing and/or processing power on vehicle 100 than analyzing the surroundings of the vehicle without discretizing the surroundings using sensing grid 102.

In some examples, vehicle 100 can be located at the center of sensing grid 102, though in other examples, the vehicle can be located at a different location of the sensing grid. As mentioned above, sensing grid 102 can include sensing cells 104, which can correspond to different locations in the surroundings of vehicle 100. Sensing cells 104 can have shapes and/or sizes determined by vehicle 100 (e.g., 50 cm×50 cm squares, or any other size or shape). The shapes and/or sizes of sensing cells 104 can affect the accuracy with which vehicle 100 determines information about its surroundings, and the computing power required for the vehicle to determine such information. For example, for a given sensing grid 102 size, relatively large sensing cells 104 can require relatively less computing power to determine one or more characteristics of the surroundings of vehicle 100 corresponding to the area of the sensing grid (e.g., because the sensing grid can include relatively few sensing cells about which the vehicle must make determinations), while providing lower resolution information about the vehicle's surroundings. Analogously, relatively small sensing cells 104 can require relatively more computing power to determine one or more characteristics of the surroundings of vehicle 100 corresponding to the area of sensing grid 102 (e.g., because the sensing grid can include relatively many sensing cells about which the vehicle must make determinations), while providing higher resolution information about the vehicle's surroundings. In other words, sensing cell 104 size and computing power requirements can be inversely related to one another. In a system of potentially limited computing power and/or energy resources, such as a computing system on vehicle 100, it can be beneficial to maintain low computing power requirements. However, it can also be beneficial for vehicle 100 to, at appropriate times, have high resolution information about its surroundings, such as during automated parking procedures. As such, in some examples, vehicle 100 can change the sizes of sensing cells 104 dynamically based on various considerations. In this way, when high-resolution information about the surroundings of vehicle 100 is not needed, the vehicle can configure sensing grid 102 to have relatively large sensing cell 104 size and can reduce the corresponding computing power requirements for processing information in the sensing grid, and when high-resolution information about the surroundings of the vehicle is desired, the vehicle can configure the sensing grid to have relatively small sensing cell size and can improve the resolution of information about the vehicle's surroundings.

Figure 1B:
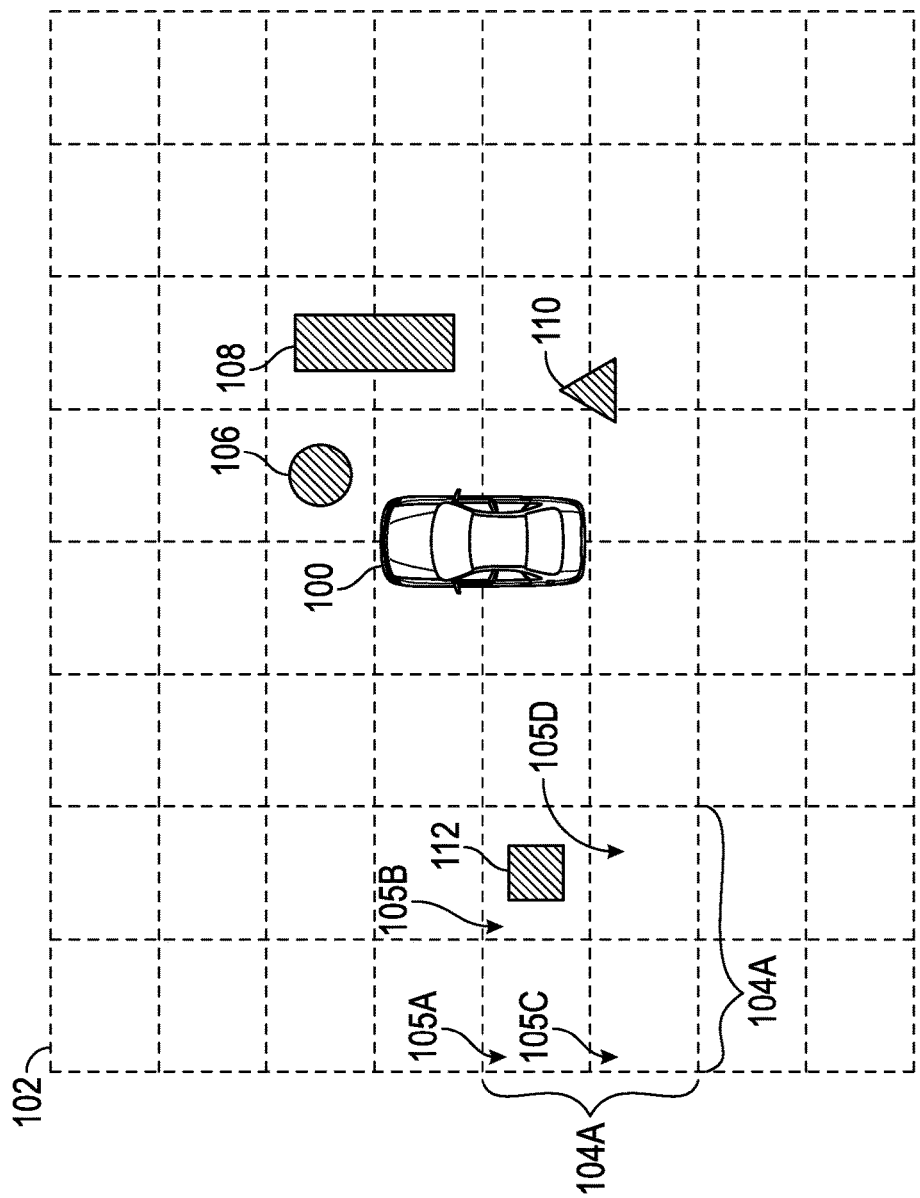
FIG. 1B illustrates an exemplary vehicle and sensing grid having sensing cells that are smaller than sensing cells in FIG. 1A according to examples of the disclosure.

FIG. 1B illustrates exemplary vehicle 100 and sensing grid 102 having sensing cells 105 that are smaller than sensing cells 104 in FIG. 1A according to examples of the disclosure. In FIG. 1B, vehicle 100 can have split each sensing cell 104 in FIG. 1A into four sensing cells 105, while maintaining the total size of sensing grid 102. For example, sensing cell 104A in FIG. 1A can be split into four smaller sensing cells 105A, 105B, 105C and 105D (e.g., four smaller square sensing cells). As previously described, because sensing cells 105 can be smaller than sensing cells 104 in FIG. 1A, sensing grid 102 in FIG. 1B can allow for vehicle 100 to determine information about its surroundings with higher resolution than does sensing grid 102 in FIG. 1A. For example, whereas in FIG. 1A, vehicle 100 can determine that object 112 exists somewhere in sensing cell 104A (e.g., the vehicle can mark sensing cell 104A as being occupied, and can thus avoid the real world location corresponding to sensing cell 104A during automated driving or parking procedures), in FIG. 1B, the vehicle can more precisely determine that object 112 exists in sensing cell 105B, but that sensing cells 105A, 105C and 105D do not include any objects. Therefore, the smaller sensing cell size of sensing grid 102 in FIG. 1B can provide for higher-resolution information determination about the surroundings of vehicle 100 than the larger sensing cell size of sensing grid 102 in FIG. 1A.

In some examples, vehicle 100 can dynamically configure sensing grid 102 to have the larger sensing cell 104 size of FIG. 1A or the smaller sensing cell 105 size of FIG. 1B based on the speed at which the vehicle is traveling. Specifically, when vehicle 100 is moving below a speed threshold, the vehicle can select the smaller sensing cell size of FIG. 1B (e.g., to provide higher resolution information about the vehicle's surroundings for parking or other tight maneuvering actions). When vehicle 100 is moving above a speed threshold, the vehicle can select the larger sensing cell size of FIG. 1A. It is understood that the smaller and larger sensing cell sizes provided in FIGS. 1A-1B, and throughout this disclosure, are exemplary only, and that the vehicle of the disclosure can select any number of sensing cell sizes, not just those described here, based on the various considerations referenced in this disclosure. Additionally, the sensing cell sizes selected by the vehicle can be variable and not selected from a number of fixed and/or predetermined sensing cell sizes.

In some examples, in addition or alternatively to vehicle speed, vehicle 100 can determine sensing cell size based on characteristics of objects in the vehicle's surroundings (e.g., within the boundaries of sensing grid 102, or more generally, within a predetermined distance of the vehicle). Specifically, if greater than a threshold number of objects in the surroundings of vehicle 100 are smaller than a size threshold, the vehicle can select the smaller sensing cell size of FIG. 1B to be able to resolve those small objects, and can otherwise select the larger sensing cell size of FIG. 1A. In some examples, in addition or alternatively to the factors discussed above, the sensing cell size selected by vehicle 100 can be based on the sizes of the objects in the vehicle's surroundings (e.g., a multiple of the size of the smallest object in the vehicle's surroundings). In some examples, in addition or alternatively to the factors discussed above, if greater than a threshold number of objects are in the surroundings of vehicle 100, the vehicle can select the smaller sensing cell size of FIG. 1B, and can otherwise select the larger sensing cell size of FIG. 1A. In some examples, in addition or alternatively to the factors discussed above, if the density of objects in the surroundings of vehicle 100 is greater than a density threshold, the vehicle can select the smaller sensing cell size of FIG. 1B, and can otherwise select the larger sensing cell size of FIG. 1A.

In some examples, in addition or alternatively to the factors discussed above, vehicle 100 can determine sensing cell size based on characteristics of the vehicle itself; for example, a current driving mode of the vehicle. For example, if vehicle 100 is in an automated parking mode, the vehicle can select the smaller sensing cell size of FIG. 1B to provide higher resolution information about the vehicle's surroundings for use during automated parking maneuvers. As another example, if vehicle 100 is in a city driving mode (e.g., for traveling at moderate speeds above parking speeds and below highway speeds), the vehicle can select a medium sensing cell size, if the vehicle is in a parking mode (e.g., for traveling a low speeds), the vehicle can select a small sensing cell size, and if the vehicle is in a highway driving mode (e.g., for traveling at high speeds), the vehicle can select a large sensing cell size. As another example, if vehicle 100 is in reverse gear, the vehicle can select the smaller sensing cell size of FIG. 1B to provide for higher resolution information about the vehicle's surroundings while the driver of the vehicle, or the vehicle itself, moves backwards.

Figure 1C:
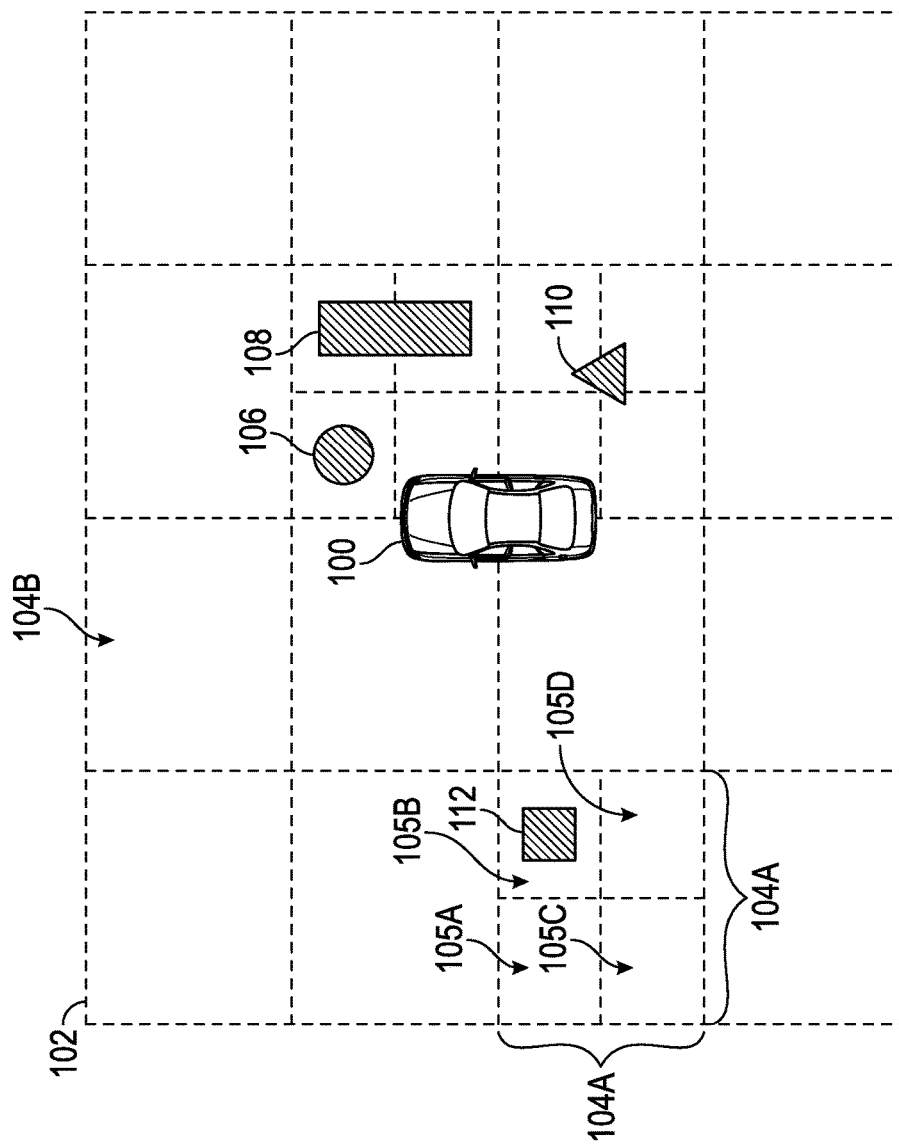
FIG. 1C illustrates an exemplary vehicle and sensing grid having different sized sensing cells in different portions of the sensing grid according to examples of the disclosure.

In some examples, vehicle 100 can select different sensing cell sizes in different portions of sensing grid 102 based on one or more of the factors described above and throughout this disclosure. FIG. 1C illustrates exemplary vehicle 100 and sensing grid 102 having different sized sensing cells in different portions of the sensing grid according to examples of the disclosure. Sensing grid 102 can include one or more regions in which the sensing cells have a first size (e.g., a larger size, such as sensing cell 104B), and one or more regions in which the sensing cells have a second size, different from the first size (e.g., a smaller size, such as sensing cells 105A-105D). In some examples, vehicle 100 can initialize sensing grid 102 to initially have relatively large sensing cells, such as sensing cell 104B, and can split those sensing cells in which objects are detected into smaller sensing cells, such as sensing cells 105A-105D. In this way, vehicle 100 can determine relatively high-resolution information about areas in its surroundings in which objects are present, while maintaining the lower computing power benefits of larger sensing cells in areas in which objects are not present. It is understood that other considerations for vehicle 100 selecting non-uniform sensing cell sizes in different regions of sensing grid 102 in accordance with the examples provided in this disclosure are also within the scope of this disclosure, such as considerations based on one or more of the sensing cell size-factors described throughout this disclosure.

In some examples, in addition or alternatively to the factors discussed above, the vehicle of this disclosure can determine sensing cell size based on characteristics of the roads on which the vehicle is located or traveling. FIG. 2A illustrates exemplary vehicle 200 and sensing grid 202 according to examples of the disclosure. The details of sensing grid 202 can be substantially the same as those of sensing grid 102 in FIG. 1A. Vehicle 200 can be traveling on road 214. Using one or more sensor systems on vehicle 200, the vehicle can determine that road 214, within a predetermined distance of the vehicle (e.g., within sensing grid 102), has relatively low curvature (e.g., the road does not include a curve having greater than a threshold curvature within the predetermined distance of the vehicle, the road has less than a threshold number of curves within the predetermined distance of the vehicle, the road has less than a threshold number of curves having greater than a threshold curvature within the predetermined distance of the vehicle, etc.). As a result, vehicle 200 can select a relatively large sensing cell 204 size for sensing grid 202, because the vehicle may not require high-resolution information about the low curvature road to accurately determine a path on the road for the vehicle to follow (e.g., for automated driving purposes).

Figure 2B:
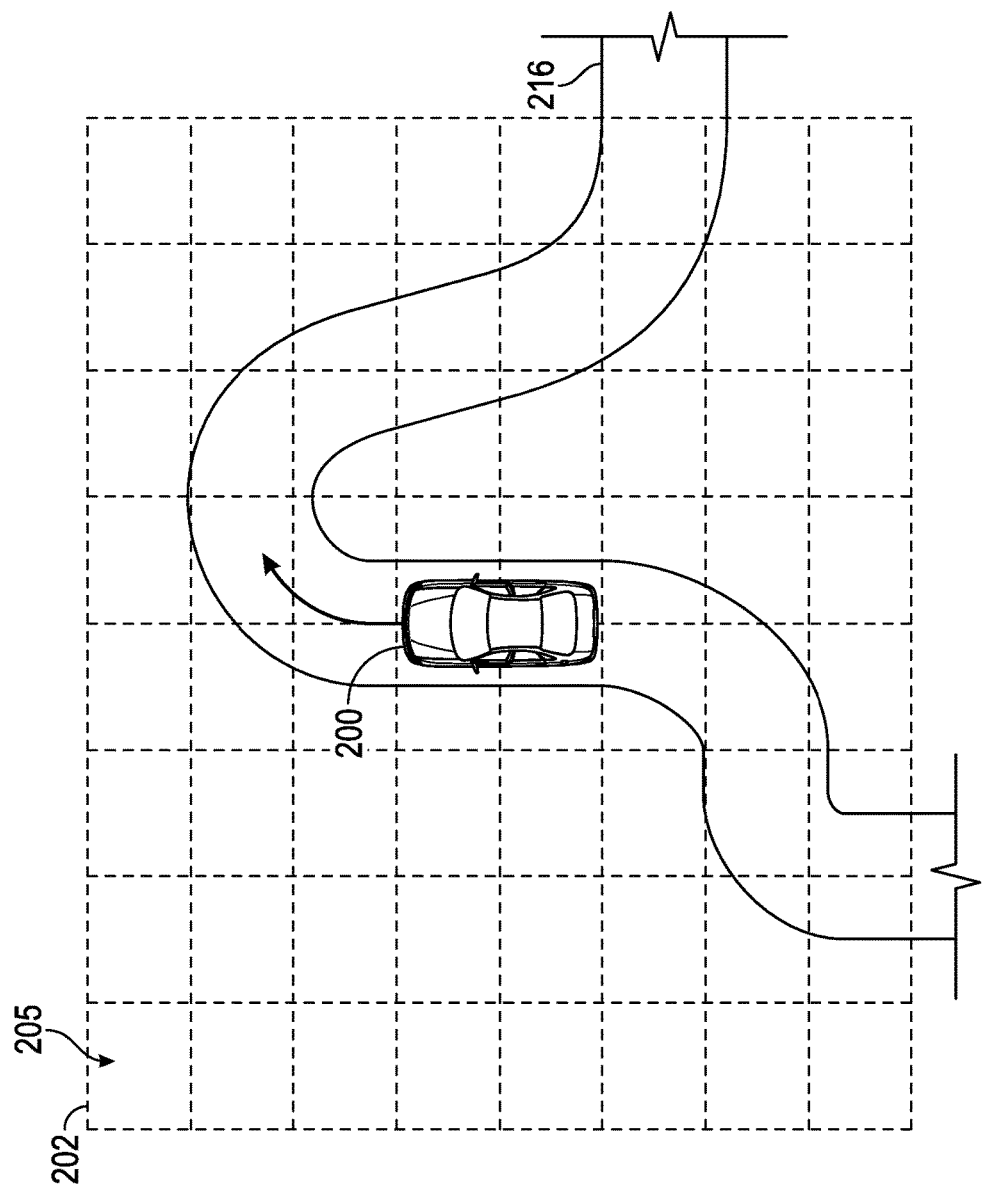
FIG. 2B illustrates another exemplary vehicle and sensing grid having sensing cells that are smaller than sensing cells in FIG. 2A according to examples of the disclosure.

In comparison, FIG. 2B illustrates exemplary vehicle 200 and sensing grid 202 having sensing cells 205 that are smaller than sensing cells 204 in FIG. 2A according to examples of the disclosure. The details of sensing grid 202 can be substantially the same as those of sensing grid 102 in FIG. 1B. Vehicle 200 can be traveling on road 216. Using one or more sensor systems on vehicle 200, the vehicle can determine that road 216, within a predetermined distance of the vehicle (e.g., within sensing grid 102), has relatively high curvature (e.g., the road includes a curve having greater than a threshold curvature within the predetermined distance of the vehicle, the road has greater than a threshold number of curves within the predetermined distance of the vehicle, the road has greater than a threshold number of curves having greater than a threshold curvature within the predetermined distance of the vehicle, etc.). As a result, vehicle 200 can select a relatively small sensing cell 205 size for sensing grid 202—smaller than the sizes of sensing cells 204 in FIG. 2A—because the vehicle may require high-resolution information about the high curvature road to accurately determine a path on the road for the vehicle to follow (e.g., for automated driving purposes).

In some examples, in addition or alternatively to the factors discussed above, vehicle 200 can determine sensing cell size based on one or more characteristics about the location of the vehicle. For example, using Global Positioning System (GPS) data from an on-board GPS receiver on vehicle 200, the vehicle can determine its location, and based on that location, can determine sensing cell size. For example, if vehicle 200 determines that it is in a city (or other dense or highly-populated area, such as an area having a population density greater than a population density threshold), it can select a relatively small sensing cell 205 size (e.g., as illustrated in FIG. 2B). If, on the other hand, vehicle 200 determines that it is in a rural area (or other sparse or lightly-populated area, such as an area having a population density less than the population density threshold), it can select a relatively large sensing cell 204 size (e.g., as illustrated in FIG. 2A).

Figure 3:
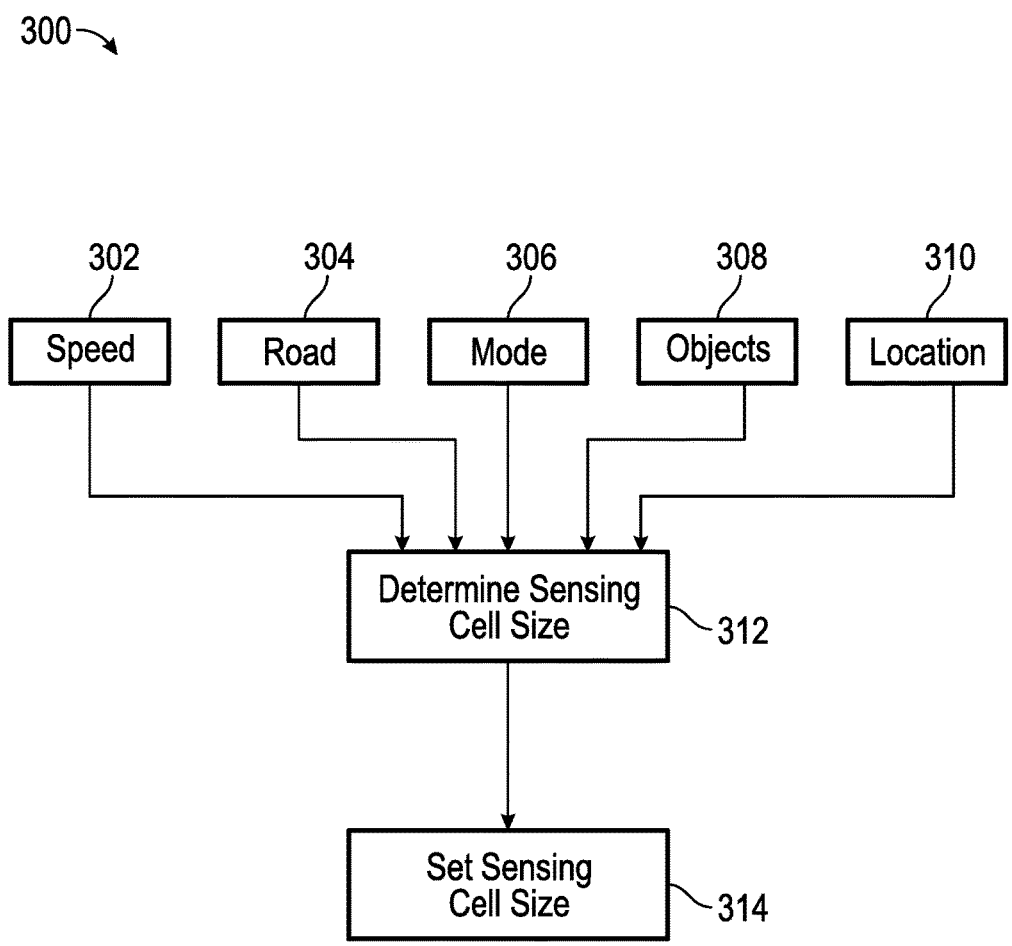
FIG. 3 illustrates an exemplary process for determining and setting the sensing cell size of a sensing grid according to examples of the disclosure.

FIG. 3 illustrates an exemplary process 300 for determining and setting the sensing cell size of a sensing grid according to examples of the disclosure. Process 300 can be performed continuously or repeatedly by the vehicle whenever information about the vehicle's surroundings is needed (e.g., during automated or non-automated parking procedures, during automated or non-automated driving procedures, etc.).

At 302, the speed of the vehicle can be monitored (e.g., as described with reference to FIGS. 1A-1C). In some examples, the speed of the vehicle can be determined using a speed sensor coupled to the wheels of the vehicle, a GPS receiver on the vehicle, or any other sensor on the vehicle that can determine the vehicle's speed.

At 304, one or more characteristics of the road(s) in the vehicle's surroundings can be monitored (e.g., as described with reference to FIGS. 2A-2B). For example, the number and/or degree of road curves in the vehicle's surroundings (e.g., within the boundaries of the sensing grid) can be monitored. In some examples, only the characteristics of the road on which the vehicle is traveling may be monitored at 304. In some examples, the characteristics of the road(s) in the vehicle's surroundings can be monitored using one or more of optical cameras, ultrasonic sensors, GPS sensors, radar sensors, LIDAR sensors, and any other sensor that can be used to determine the characteristics of roads in the vehicle's surroundings.

At 306, one or more characteristics of the current driving mode of the vehicle can be monitored (e.g., as described with reference to FIGS. 1A-1C). For example, it can be determined whether the vehicle is in a parking mode, a city driving mode, a highway driving mode, or any other driving mode. In some examples, these modes can be automatically initiated by the vehicle based on how a driver is using the vehicle and/or where the vehicle is located, while in some examples, these modes can be manually initiated by a driver of the vehicle (e.g., in response to a button press by the driver).

At 308, one or more characteristics of objects in the vehicle's surroundings can be monitored (e.g., as described with reference to FIGS. 1A-C). For example, a number of objects in the vehicle's surroundings, the sizes of objects in the vehicle's surroundings, the types of objects in the vehicle's surroundings (e.g., static objects, moving objects, such as other vehicles, etc.), or any other characteristics of the objects in the vehicle's surroundings can be monitored at 308. In some examples, the characteristics of the objects in the vehicle's surroundings can be monitored using one or more of optical cameras, ultrasonic sensors, GPS sensors, radar sensors, LIDAR sensors, and any other sensor that can be used to determine the characteristics of objects in the vehicle's surroundings.

At 310, one or more characteristics of the vehicle's location can be monitored (e.g., as described with reference to FIGS. 2A-2B). For example, using GPS data received from a GPS receiver on the vehicle, the vehicle can determine its location, whether that location is in a city or in a rural area, or any other information about the vehicle's location. In some examples, the characteristics of the vehicle's location can be monitored using one or more of optical cameras, ultrasonic sensors, GPS sensors, radar sensors, LIDAR sensors, and any other sensor that can be used to determine the characteristics of the vehicle's location.

At 312, the vehicle can determine a desired sensing cell size based on the results of one or more of steps 302, 304, 306, 308 and 310 (e.g., as described with reference to FIGS. 1A-1C and 2A-2B). This determination can include determining a constant sensing cell size to be used throughout the entirety of the sensing grid, or can include determining different sensing cell sizes to be used in different portions of the sensing grid. Further, in some examples, this determination at 312 can include selecting from a predetermined number of sensing cell sizes (e.g., small, medium, and large), or can include determining a sensing cell size that is not selected from a predetermined number of sensing cell sizes (e.g., variable, unconstrained sensing cell sizes). In some examples, sensing cell sizes can be determined based on a predetermined relationship between sensing cells of different sizes. For example, the vehicle can utilize a quadtree sensing cell data structure (e.g., an "Octomap") in which every sensing cell has four "children" sensing cells. In this way, when the vehicle determines that a smaller sensing cell size should be selected, it can move down the quadtree to split one sensing cell into four smaller sensing cells (e.g., as described with reference to FIGS. 1A-1C and 2A-2B). The vehicle can continue moving down the quadtree in this way until the desired sensing cell size is reached. Analogously, if the vehicle determines that a larger sensing cell size should be selected, it can move up the quadtree to combine four smaller sensing cells into one larger sensing cell. Using a quadtree sensing cell data structure (or any other predetermined sensing cell size relationship) provides an easy and predictable way for the vehicle to change sensing cell size dynamically, as described in this disclosure.

At 314, the sensing cell size in a sensing grid can be set based on the determination at 312 (e.g., as described with reference to FIGS. 1A-1C and 2A-2B). In some examples, the sensing cell size set at 314 can be used in the sensing grid for any one or more of mapping, vehicle localization and vehicle path planning, among other applications. Mapping, for example, can entail determining the locations of objects in the vehicle's surroundings, and mapping those locations relative to the vehicle. Vehicle localization can entail matching a predetermined (e.g., pre-stored) map of the vehicle's surroundings with features or objects detected in the vehicle's surroundings to localize the vehicle within the predetermined map. Vehicle path planning can entail determining one or more optimal paths for the vehicle to move from a first location to a second location based on features or objects detected by the vehicle in its surroundings. Additional processes can similarly utilize the sensing grid, and thus the dynamically variable sensing cell size, of this disclosure.

Figure 4:
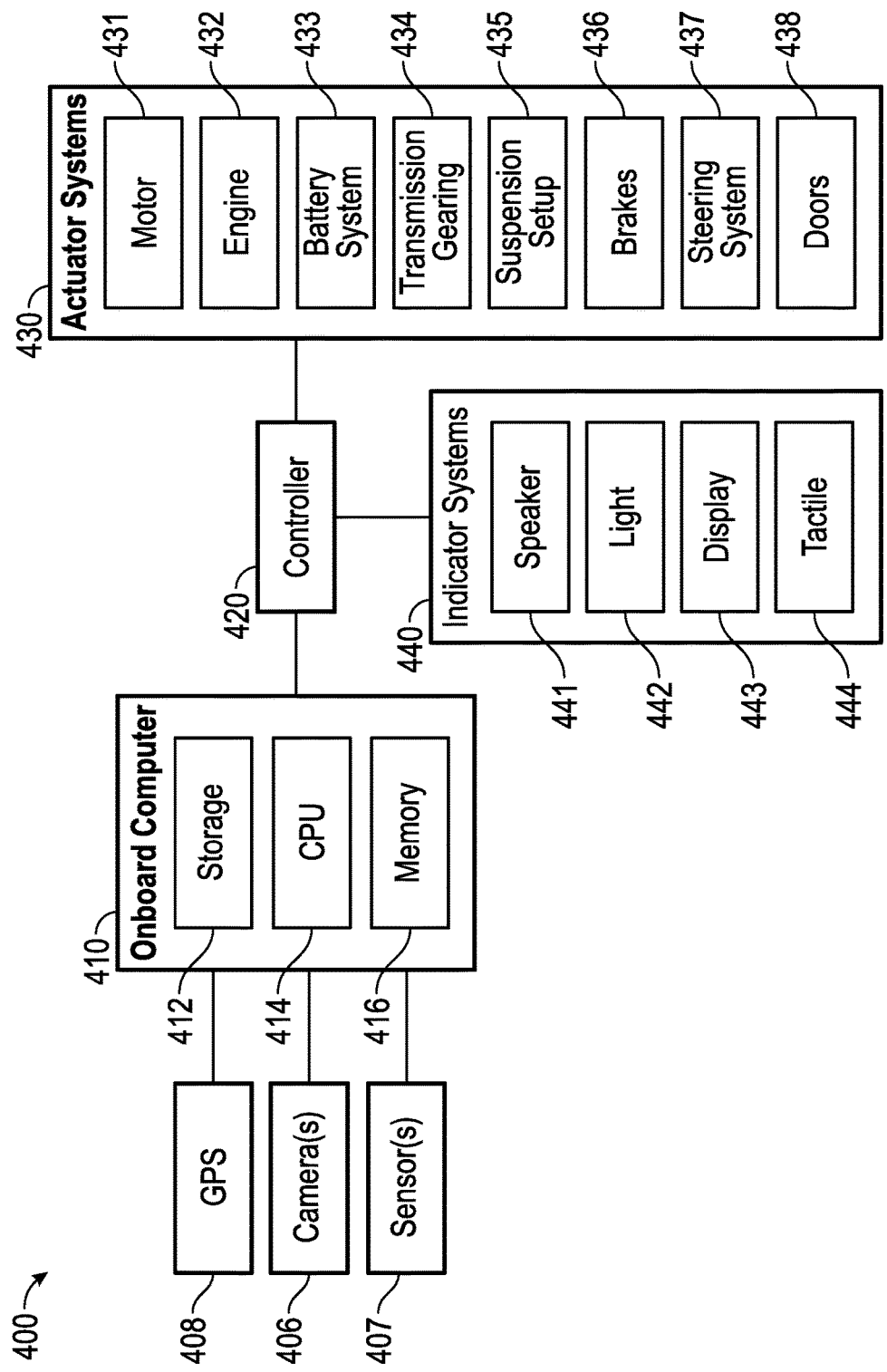
FIG. 4 illustrates an exemplary system block diagram of a vehicle control system according to examples of the disclosure.

FIG. 4 illustrates an exemplary system block diagram of vehicle control system 400 according to examples of the disclosure. Vehicle control system 400 can perform any of the methods described with reference to FIGS. 1A-1C, 2A-2B and 3. System 400 can be incorporated into a vehicle, such as a consumer automobile. Other example vehicles that may incorporate the system 400 include, without limitation, airplanes, boats, or industrial automobiles. Vehicle control system 400 can include one or more cameras 406 capable of capturing image data (e.g., video data) for determining various characteristics of the vehicle's surroundings, as described with reference to FIGS. 1A-1C, 2A-2B and 3. Vehicle control system 400 can also include one or more other sensors 407 (e.g., radar, ultrasonic, LIDAR, etc.) capable of detecting various characteristics of the vehicle's surroundings, and a Global Positioning System (GPS) receiver 408 capable of determining the location of the vehicle. Vehicle control system 400 can include an on-board computer 410 that is coupled to the cameras 406, sensors 407 and GPS receiver 408, and that is capable of receiving the image data from the cameras and/or outputs from the sensors 407 and the GPS receiver 408. The on-board computer 410 can be capable of determining and setting sensing cell size in a sensing grid around the vehicle, as described in this disclosure. On-board computer 410 can include storage 412, memory 416, and a processor 414. Processor 414 can perform any of the methods described with reference to FIGS. 1A-1C, 2A-2B and 3. Additionally, storage 412 and/or memory 416 can store data and instructions for performing any of the methods described with reference to FIGS. 1A-1C, 2A-2B and 3. Storage 412 and/or memory 416 can be any non-transitory computer readable storage medium, such as a solid-state drive or a hard disk drive, among other possibilities. The vehicle control system 400 can also include a controller 420 capable of controlling one or more aspects of vehicle operation, such as performing autonomous parking or driving operations using the sensing cells and sensing grids determined by the on-board computer 410.

In some examples, the vehicle control system 400 can be connected to (e.g., via controller 420) one or more actuator systems 430 in the vehicle and one or more indicator systems 440 in the vehicle. The one or more actuator systems 430 can include, but are not limited to, a motor 431 or engine 432, battery system 433, transmission gearing 434, suspension setup 435, brakes 436, steering system 437 and door system 438. The vehicle control system 400 can control, via controller 420, one or more of these actuator systems 430 during vehicle operation; for example, to open or close one or more of the doors of the vehicle using the door actuator system 438, to control the vehicle during autonomous driving or parking operations, which can utilize the sensing cells and sensing grids determined by the on-board computer 410, using the motor 431 or engine 432, battery system 433, transmission gearing 434, suspension setup 435, brakes 436 and/or steering system 437, etc. The one or more indicator systems 440 can include, but are not limited to, one or more speakers 441 in the vehicle (e.g., as part of an entertainment system in the vehicle), one or more lights 442 in the vehicle, one or more displays 443 in the vehicle (e.g., as part of a control or entertainment system in the vehicle) and one or more tactile actuators 444 in the vehicle (e.g., as part of a steering wheel or seat in the vehicle). The vehicle control system 400 can control, via controller 420, one or more of these indicator systems 440 to provide indications to a driver of the vehicle of one or more characteristics of the vehicle's surroundings that are determined using the sensing cells and sensing grids configured by the on-board computer 410.

Thus, the examples of the disclosure provide various ways to dynamically adjust the sizes of sensing cells in a sensing grid surrounding a vehicle.

Therefore, according to the above, some examples of the disclosure are directed to a system comprising: one or more processors; and a memory including instructions, which when executed by the one or more processors, cause the one or more processors to perform a method comprising: at a first time, determining one or more characteristics about an area surrounding a vehicle using a first sensing grid including first sensing cells of a first size; at a second time, after the first time, determining whether sensing cell size data satisfies sensing cell size change criteria; and in response to the determination: in accordance with a determination that the sensing cell size data satisfies the sensing cell size change criteria, determining one or more characteristics about the area surrounding the vehicle using a second sensing grid including second sensing cells of a second size, different from the first size; and in accordance with a determination that the sensing cell size data does not satisfy the sensing cell size change criteria, determining one or more characteristics about the area surrounding the vehicle using the first sensing grid including the first sensing cells of the first size. Additionally or alternatively to one or more of the examples disclosed above, in some examples, the second sensing grid includes the second sensing cells of the second size and the first sensing cells of the first size. Additionally or alternatively to one or more of the examples disclosed above, in some examples, the second sensing grid does not include the first sensing cells of the first size. Additionally or alternatively to one or more of the examples disclosed above, in some examples, the second size is smaller than the first size. Additionally or alternatively to one or more of the examples disclosed above, in some examples, a total size of the first sensing grid equals a total size of the second sensing grid. Additionally or alternatively to one or more of the examples disclosed above, in some examples, the area surrounding the vehicle comprises an area within a predetermined distance of the vehicle. Additionally or alternatively to one or more of the examples disclosed above, in some examples, the one or more characteristics about the area surrounding the vehicle include one or more locations of objects surrounding the vehicle, a path of a road on which the vehicle is traveling, types of objects surrounding the vehicle, or movements of objects surrounding the vehicle. Additionally or alternatively to one or more of the examples disclosed above, in some examples, the sensing cell size data includes data indicative of a speed of the vehicle, and the sensing cell size change criteria include a criterion that is satisfied when the speed of the vehicle is below a threshold speed. Additionally or alternatively to one or more of the examples disclosed above, in some examples, the sensing cell size data includes data indicative of characteristics of one or more objects in the area surrounding the vehicle. Additionally or alternatively to one or more of the examples disclosed above, in some examples, the sensing cell size change criteria include a criterion that is satisfied when greater than a threshold number of objects in the area surrounding the vehicle are smaller than a size threshold. Additionally or alternatively to one or more of the examples disclosed above, in some examples, the sensing cell size change criteria include a criterion that is satisfied when greater than a threshold number of objects are in the area surrounding the vehicle. Additionally or alternatively to one or more of the examples disclosed above, in some examples, the sensing cell size change criteria include a criterion that is satisfied when greater than a threshold density of objects is in the area surrounding the vehicle. Additionally or alternatively to one or more of the examples disclosed above, in some examples, the sensing cell size data includes data indicative of a driving mode of the vehicle, and the sensing cell size change criteria include a criterion that is satisfied when the driving mode of the vehicle is a first driving mode, and not satisfied when the driving mode of the vehicle is a second driving mode, different from the first driving mode. Additionally or alternatively to one or more of the examples disclosed above, in some examples, the first driving mode and the second driving mode comprise one or more of an automated parking mode, an automated driving mode, a city driving mode, a highway driving mode, and a reverse driving mode. Additionally or alternatively to one or more of the examples disclosed above, in some examples, the sensing cell size data includes data indicative of characteristics of a road on which the vehicle is traveling. Additionally or alternatively to one or more of the examples disclosed above, in some examples, the sensing cell size change criteria include a criterion that is satisfied when the road includes a curve having greater than a threshold curvature within the area surrounding the vehicle. Additionally or alternatively to one or more of the examples disclosed above, in some examples, the sensing cell size change criteria include a criterion that is satisfied when the road has greater than a threshold number of curves within the area surrounding the vehicle. Additionally or alternatively to one or more of the examples disclosed above, in some examples, the sensing cell size change criteria include a criterion that is satisfied when the road has greater than a threshold number of curves having greater than a threshold curvature within the area surrounding the vehicle. Additionally or alternatively to one or more of the examples disclosed above, in some examples, the sensing cell size data includes data indicative of a location of the vehicle, and the sensing cell size change criteria include a criterion that is satisfied when the location of the vehicle is a first location, and not satisfied when the location of the vehicle is a second location, different from the first location. Additionally or alternatively to one or more of the examples disclosed above, in some examples, the first location corresponds to an area with a population density greater than a population density threshold, and the second location corresponds to an area with a population density less than the population density threshold.

Some examples of the disclosure are directed to a non-transitory computer-readable medium including instructions, which when executed by one or more processors, cause the one or more processors to perform a method comprising: at a first time, determining one or more characteristics about an area surrounding a vehicle using a first sensing grid including first sensing cells of a first size; at a second time, after the first time, determining whether sensing cell size data satisfies sensing cell size change criteria; and in response to the determination: in accordance with a determination that the sensing cell size data satisfies the sensing cell size change criteria, determining one or more characteristics about the area surrounding the vehicle using a second sensing grid including second sensing cells of a second size, different from the first size; and in accordance with a determination that the sensing cell size data does not satisfy the sensing cell size change criteria, determining one or more characteristics about the area surrounding the vehicle using the first sensing grid including the first sensing cells of the first size.

Some examples of the disclosure are directed to a vehicle comprising: one or more sensors; one or more processors coupled to the one or more sensors; and a memory including instructions, which when executed by the one or more processors, cause the one or more processors to perform a method comprising: at a first time, determining one or more characteristics about an area surrounding a vehicle using a first sensing grid including first sensing cells of a first size, the determination based on outputs from the one or more sensors; at a second time, after the first time, determining whether sensing cell size data satisfies sensing cell size change criteria; and in response to the determination: in accordance with a determination that the sensing cell size data satisfies the sensing cell size change criteria, determining one or more characteristics about the area surrounding the vehicle using a second sensing grid including second sensing cells of a second size, different from the first size, the determination based on outputs from the one or more sensors; and in accordance with a determination that the sensing cell size data does not satisfy the sensing cell size change criteria, determining one or more characteristics about the area surrounding the vehicle using the first sensing grid including the first sensing cells of the first size, the determination based on outputs from the one or more sensors.

Some examples of the disclosure are directed to a system comprising: one or more sensors; one or more processors coupled to the one or more sensors; and a memory including instructions, which when executed by the one or more processors, cause the one or more processors to perform a method comprising: at a first time, determining one or more characteristics about an area surrounding a vehicle using the one or more sensors, the one or more sensors configured to use a first sensing grid including first sensing cells of a first size; at a second time, after the first time, determining whether sensing cell size data satisfies sensing cell size change criteria, wherein: the sensing cell size data includes data indicative of: one or more characteristics of the vehicle, one or more characteristics of a road on which the vehicle is traveling, or one or more characteristics of a location of the vehicle, and the sensing cell size change criteria include: a criterion that is satisfied when the one or more characteristics of the vehicle include a first characteristic, a criterion that is satisfied when the one or more characteristics of the road include a second characteristic, or a criterion that is satisfied when the one or more characteristics of the location of the vehicle include a third characteristic; and in response to the determination: in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size. Additionally or alternatively to one or more of the examples disclosed above, in some examples, the second sensing grid does not include the first sensing cells of the first size. Additionally or alternatively to one or more of the examples disclosed above, in some examples, the second size is smaller than the first size. Additionally or alternatively to one or more of the examples disclosed above, in some examples, a total size of the first sensing grid equals a total size of the second sensing grid. Additionally or alternatively to one or more of the examples disclosed above, in some examples, the area surrounding the vehicle comprises an area within a predetermined distance of the vehicle. Additionally or alternatively to one or more of the examples disclosed above, in some examples, the one or more characteristics about the area surrounding the vehicle include one or more locations of objects surrounding the vehicle, a path of a road on which the vehicle is traveling, types of objects surrounding the vehicle, or movements of objects surrounding the vehicle. Additionally or alternatively to one or more of the examples disclosed above, in some examples, the one or more characteristics of the vehicle include a speed of the vehicle, and the sensing cell size data satisfies the sensing cell size change criteria when the speed of the vehicle is below a threshold speed. Additionally or alternatively to one or more of the examples disclosed above, in some examples, the sensing cell size data further includes data indicative of characteristics of one or more objects in the area surrounding the vehicle. Additionally or alternatively to one or more of the examples disclosed above, in some examples, the sensing cell size change criteria include a criterion that is satisfied when greater than a threshold number of objects in the area surrounding the vehicle are smaller than a size threshold. Additionally or alternatively to one or more of the examples disclosed above, in some examples, the sensing cell size change criteria include a criterion that is satisfied when greater than a threshold number of objects are in the area surrounding the vehicle. Additionally or alternatively to one or more of the examples disclosed above, in some examples, the sensing cell size change criteria include a criterion that is satisfied when greater than a threshold density of objects is in the area surrounding the vehicle. Additionally or alternatively to one or more of the examples disclosed above, in some examples, the one or more characteristics of the vehicle include a driving mode of the vehicle, and the sensing cell size data satisfies the sensing cell size change criteria when the driving mode of the vehicle is a first driving mode, and does not satisfy the sensing cell size change criteria when the driving mode of the vehicle is a second driving mode, different from the first driving mode. Additionally or alternatively to one or more of the examples disclosed above, in some examples, the first driving mode and the second driving mode comprise one or more of an automated parking mode, an automated driving mode, a city driving mode, a highway driving mode, and a reverse driving mode. Additionally or alternatively to one or more of the examples disclosed above, in some examples, the sensing cell size data satisfies the sensing cell size change criteria when the road includes a curve having greater than a threshold curvature within the area surrounding the vehicle. Additionally or alternatively to one or more of the examples disclosed above, in some examples, the sensing cell size data satisfies the sensing cell size change criteria when the road has greater than a threshold number of curves within the area surrounding the vehicle. Additionally or alternatively to one or more of the examples disclosed above, in some examples, the sensing cell size data satisfies the sensing cell size change criteria when the road has greater than a threshold number of curves having greater than a threshold curvature within the area surrounding the vehicle. Additionally or alternatively to one or more of the examples disclosed above, in some examples, the sensing cell size data satisfies the sensing cell size change criteria when the location of the vehicle is a first location, and does not satisfy the sensing cell size change criteria when the location of the vehicle is a second location, different from the first location. Additionally or alternatively to one or more of the examples disclosed above, in some examples, the first location corresponds to an area with a population density greater than a population density threshold, and the second location corresponds to an area with a population density less than the population density threshold.

Some examples of the disclosure are directed to a non-transitory computer-readable medium including instructions, which when executed by one or more processors, cause the one or more processors to perform a method comprising: at a first time, determining one or more characteristics about an area surrounding a vehicle using one or more sensors, the one or more sensors configured to use a first sensing grid including first sensing cells of a first size; at a second time, after the first time, determining whether sensing cell size data satisfies sensing cell size change criteria, wherein: the sensing cell size data includes data indicative of: one or more characteristics of the vehicle, one or more characteristics of a road on which the vehicle is traveling, or one or more characteristics of a location of the vehicle, and the sensing cell size change criteria include: a criterion that is satisfied when the one or more characteristics of the vehicle include a first characteristic, a criterion that is satisfied when the one or more characteristics of the road include a second characteristic, or a criterion that is satisfied when the one or more characteristics of the location of the vehicle include a third characteristic; and in response to the determination: in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size.

Some examples of the disclosure are directed to a vehicle comprising: one or more sensors; one or more processors coupled to the one or more sensors; and a memory including instructions, which when executed by the one or more processors, cause the one or more processors to perform a method comprising: at a first time, determining one or more characteristics about an area surrounding the vehicle using the one or more sensors, the one or more sensors configured to use a first sensing grid including first sensing cells of a first size; at a second time, after the first time, determining whether sensing cell size data satisfies sensing cell size change criteria, wherein: the sensing cell size data includes data indicative of: one or more characteristics of the vehicle, one or more characteristics of a road on which the vehicle is traveling, or one or more characteristics of a location of the vehicle, and the sensing cell size change criteria include: a criterion that is satisfied when the one or more characteristics of the vehicle include a first characteristic, a criterion that is satisfied when the one or more characteristics of the road include a second characteristic, or a criterion that is satisfied when the one or more characteristics of the location of the vehicle include a third characteristic; and in response to the determination: in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A system comprising:
one or more sensors;
one or more processors coupled to the one or more sensors; and
a memory including instructions, which when executed by the one or more processors, cause the one or more processors to perform a method comprising:
at a first time, determining one or more characteristics about an area surrounding a vehicle using the one or more sensors, the one or more sensors configured to use a first sensing grid including first sensing cells of a first size;
at a second time, after the first time, determining whether sensing cell size data satisfies sensing cell size change criteria, wherein:
the sensing cell size data includes data indicative of:
one or more characteristics of the vehicle,
one or more characteristics of a road on which the vehicle is traveling, or
one or more characteristics of a location of the vehicle, and
the sensing cell size change criteria include:
a criterion that is satisfied when the one or more characteristics of the vehicle include a first characteristic,
a criterion that is satisfied when the one or more characteristics of the road include a second characteristic, or
a criterion that is satisfied when the one or more characteristics of the location of the vehicle include a third characteristic; and
in response to the determination:
in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and
in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size.
2. The system of claim 1, wherein the second sensing grid does not include the first sensing cells of the first size.

3. The system of claim 1, wherein the second size is smaller than the first size.

4. The system of claim 1, wherein a total size of the first sensing grid equals a total size of the second sensing grid.

5. The system of claim 1, wherein the area surrounding the vehicle comprises an area within a predetermined distance of the vehicle.

6. The system of claim 1, wherein the one or more characteristics about the area surrounding the vehicle include one or more locations of objects surrounding the vehicle, a path of a road on which the vehicle is traveling, types of objects surrounding the vehicle, or movements of objects surrounding the vehicle.

7. The system of claim 1, wherein:
the one or more characteristics of the vehicle include a speed of the vehicle, and
the sensing cell size data satisfies the sensing cell size change criteria when the speed of the vehicle is below a threshold speed.

8. The system of claim 1, wherein:
the sensing cell size data further includes data indicative of characteristics of one or more objects in the area surrounding the vehicle.

9. The system of claim 8, wherein:
the sensing cell size change criteria include a criterion that is satisfied when greater than a threshold number of objects in the area surrounding the vehicle are smaller than a size threshold.

10. The system of claim 8, wherein:
the sensing cell size change criteria include a criterion that is satisfied when greater than a threshold number of objects are in the area surrounding the vehicle.

11. The system of claim 8, wherein:
the sensing cell size change criteria include a criterion that is satisfied when greater than a threshold density of objects is in the area surrounding the vehicle.

12. The system of claim 1, wherein:
the one or more characteristics of the vehicle include a driving mode of the vehicle, and
the sensing cell size data satisfies the sensing cell size change criteria when the driving mode of the vehicle is a first driving mode, and does not satisfy the sensing cell size change criteria when the driving mode of the vehicle is a second driving mode, different from the first driving mode.

13. The system of claim 12, wherein the first driving mode and the second driving mode comprise one or more of an automated parking mode, an automated driving mode, a city driving mode, a highway driving mode, and a reverse driving mode.

14. The system of claim 1, wherein:
the sensing cell size data satisfies the sensing cell size change criteria when the road includes a curve having greater than a threshold curvature within the area surrounding the vehicle.

15. The system of claim 1, wherein:
the sensing cell size data satisfies the sensing cell size change criteria when the road has greater than a threshold number of curves within the area surrounding the vehicle.

16. The system of claim 1, wherein:
the sensing cell size data satisfies the sensing cell size change criteria when the road has greater than a threshold number of curves having greater than a threshold curvature within the area surrounding the vehicle.

17. The system of claim 1, wherein:
the sensing cell size data satisfies the sensing cell size change criteria when the location of the vehicle is a first location, and does not satisfy the sensing cell size change criteria when the location of the vehicle is a second location, different from the first location.

18. The system of claim 17, wherein:
the first location corresponds to an area with a population density greater than a population density threshold, and the second location corresponds to an area with a population density less than the population density threshold.

19. A non-transitory computer-readable medium including instructions, which when executed by one or more processors, cause the one or more processors to perform a method comprising:
at a first time, determining one or more characteristics about an area surrounding a vehicle using one or more sensors, the one or more sensors configured to use a first sensing grid including first sensing cells of a first size;
at a second time, after the first time, determining whether sensing cell size data satisfies sensing cell size change criteria, wherein:
the sensing cell size data includes data indicative of:
one or more characteristics of the vehicle,
one or more characteristics of a road on which the vehicle is traveling, or
one or more characteristics of a location of the vehicle, and
the sensing cell size change criteria include:
a criterion that is satisfied when the one or more characteristics of the vehicle include a first characteristic,
a criterion that is satisfied when the one or more characteristics of the road include a second characteristic, or
a criterion that is satisfied when the one or more characteristics of the location of the vehicle include a third characteristic; and
in response to the determination:
in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and
in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size.

20. A vehicle comprising:
one or more sensors;
one or more processors coupled to the one or more sensors; and
a memory including instructions, which when executed by the one or more processors, cause the one or more processors to perform a method comprising:
at a first time, determining one or more characteristics about an area surrounding the vehicle using the one or more sensors, the one or more sensors configured to use a first sensing grid including first sensing cells of a first size;

at a second time, after the first time, determining whether sensing cell size data satisfies sensing cell size change criteria, wherein:

the sensing cell size data includes data indicative of:
one or more characteristics of the vehicle,
one or more characteristics of a road on which the vehicle is traveling, or
one or more characteristics of a location of the vehicle, and the sensing cell size change criteria include:
a criterion that is satisfied when the one or more characteristics of the vehicle include a first characteristic,
a criterion that is satisfied when the one or more characteristics of the road include a second characteristic, or
a criterion that is satisfied when the one or more characteristics of the location of the vehicle include a third characteristic; and in response to the determination:
in accordance with a determination that the sensing cell size data satisfies the sensing cell size change criteria, determining one or more characteristics about the area surrounding the vehicle using the one or more sensors, the one or more sensors configured to use a second sensing grid including second sensing cells of a second size, different from the first size; and in accordance with a determination that the sensing cell size data does not satisfy the sensing cell size change criteria, determining one or more characteristics about the area surrounding the vehicle using the one or more sensors, the one or more sensors configured to use the first sensing grid including the first sensing cells of the first size.

\* \* \* \* \*